United States Patent [19]

Kishi et al.

[11] Patent Number: 4,722,045
[45] Date of Patent: Jan. 26, 1988

[54] INPUT DATA SIGN DETERMINING METHOD

[75] Inventors: Hajimu Kishi; Masaki Seki; Takashi Takegahara, all of Tokyo, Japan

[73] Assignee: Fanuc Ltd., Minamitsuru, Japan

[21] Appl. No.: 694,382

[22] PCT Filed: Feb. 20, 1984

[86] PCT No.: PCT/JP84/00054
§ 371 Date: Jan. 7, 1985
§ 102(e) Date: Jan. 7, 1985

[87] PCT Pub. No.: WO84/04608
PCT Pub. Date: Nov. 22, 1984

[30] Foreign Application Priority Data

May 18, 1983 [JP] Japan ............... 58-087265

[51] Int. Cl.⁴ .................. G06F 15/46; G05B 19/18
[52] U.S. Cl. .................. 364/171; 318/568; 364/191; 364/474
[58] Field of Search .............. 364/167-171, 364/188, 189, 191-193, 474, 475; 318/568

[56] References Cited

U.S. PATENT DOCUMENTS

| | | | |
|---|---|---|---|
| 3,783,253 | 1/1974 | Anderson et al. | 364/171 X |
| 4,010,356 | 3/1977 | Evans et al. | 364/191 X |
| 4,328,550 | 5/1982 | Weber | 364/192 X |
| 4,393,449 | 7/1983 | Takeda et al. | 364/191 X |
| 4,445,182 | 4/1984 | Morita et al. | 364/171 X |
| 4,530,046 | 7/1985 | Munekata et al. | 364/191 |

FOREIGN PATENT DOCUMENTS 0044192 1/1982 European Pat. Off. ........... 364/474

Primary Examiner—Joseph Ruggiero
Attorney, Agent, or Firm—Staas & Halsey

[57] ABSTRACT

An input data sign determining method in a method of creating NC machining data by entering a direction ( ↑, , →, ↗, ↓, ↙, ←, ↘ ) for each block ($b_1$-$b_8$) of a part profile through use of a profile symbol key thereby to specify the part profile, followed by entering a dimension for each block of the part profile and using these entered data to create the NC machining data, the method having steps of entering, in the form of an incremental quantity along each axis (x, z), a part profile dimension in a predetermined block, discriminating the direction of the part profile in the block, and determining the sign of an entered incremental quantity on the basis of the direction to convert the incremental quantity into a signed incremental quantity.

1 Claim, 8 Drawing Figures

INPUT DATA SIGN DETERMINING METHOD

DESCRIPTION

BACKGROUND OF THE INVENTION

This invention relates to an input data sign determining method in an NC machining data creation method. More particularly, in a method of creating NC machining data by entering a tool travelling direction for each block of a part profile through use of profile symbol keys to specify the part profile, followed by entering dimensional values for each block of the part profile and using these data to create the NC machining data, the invention relates to an incremental quantity sign determining method through which the signs of incremental quantities can be determined when dimensions are specified in the form of incremental quantities along respective axes just as written on a drawing.

Automatic programming systems for lathes have come into practical use and are used to create NC tapes from a design drawing through a simple operation by entering data in a conversational mode using a graphic display screen. With such an automatic programming system, a part profile (exclusive of dimensions) can be entered merely by pressing profile symbol keys, which are located on an operator's panel, corresponding to a workpiece profile written on a design drawing. Further, according to the automatic programming system, referential information is graphically displayed on the screen from time to time and inquiries are made in ordinary language, so that dimensions and various data can be entered in response to the inquiries. When all data necessary for creation of an NC tape have been entered, the system immediately displays the blank profile and the finished profile, begins automatic calculation of NC command data and graphically displays a tool path to create an NC tape. A programming method performed by such an automatic programming system will now be described in detail. The method comprises the following steps:

(1) drawing mode selection step;
(2) blank profile and blank dimensions input step;
(3) part profile and part profile dimensions input step;
(4) machine reference point and turret position input step;
(5) process selection step;
(6) tool selection step;
(7) machining area and cutting conditions designation step; and
(8) tool path calculation step.

The necessary data are entered successively to eventually create the NC tape. In the third step for entering part profile and dimensions, coordinate axes and the blank profile, as well as a part profile inquiry, are displayed on the screen, one responds to the inquiry, while observing the design drawing, by pressing a profile symbol key on the keyboard in accordance with the profile on the design drawing, thus to enter the part profile (exclusive of dimensions). Following the entry of the part profile, the display screen makes an inquiry requesting the necessary dimensions, and dimensions taken from the design drawing are entered from the keyboard in response to the inquiry, thereby completing the entry of a part profile and dimensions. As an example, if the part profile has the shape shown in FIG. 1, then, in entering the part profile, predetermined profile symbol keys (keys indicated by the symbols ↑, /, →, ↓, \, ←, ↖, ↘, ↻), shown in FIG. 2 and provided on a keyboard 104, are pressed in accordance with the direction of the profile in each of blocks $b_1$ through $b_8$. Specifically, straight line elements $L_1$, $L_3$ and $L_5$ in first, third and fifth blocks $b_1$, $b_3$ and $b_5$ are directed horizontally (Z axis) rightward, a straight line element $L_2$ in a second block $b_2$ is directed downardly toward the right, straight line elements $L_2$, $L_4$, $L_6$ and $L_8$ in fourth, sixth and eighth blocks $b_4$, $b_6$ and $b_8$ are directed vertically (X axis) downward, and a straight line element $L_7$ in a seventh block $b_7$ is directed horizontally leftward. Therefore, entry of the part profile will be completed if the symbolic keys are pressed in the order →, ↘, →, ↓, →, ↓, ←, ↓. It should be noted that the profile symbol keys become effective as numerical value input keys automatically in dependence upon the automatic programming process steps, and it becomes possible to enter the letter of the alphabet shown at the lower right of the key tops when a shift key is pressed. Next, dimensions in each of the blocks ($b_1$–$b_8$) are entered from the drawings in response to inquiries. Specifically, $X = 100$ is entered in response to an inquiry regarding a starting point, $Z = 80$ in response to an inquiry regarding the first block, $X = -20, Z = 35$ in response to an inquiry regarding the second block, $Z = 35$ in response to an inquiry regarding the third block, $X = -30$ in response to an inquiry regarding the fourth block, $Z = 60$ in response to an inquiry regarding the fifth block, $X = -25$ in response to an inquiry regarding the sixth block, $Z = -105$ in response to an inquiry regarding the seventh block, and $X = -25$ in response to an inquiry regarding the eighth block, wherein a numerical value following the letter of the alphabet X indicates an incremental quantity along the X axis, and a numerical value following the letter of the alphabet Z indicates an incremental quantity along the Z axis. The operation for entering the part profile and dimensions in the above-described third step is completed by the foregoing procedure.

When the incremental quantities of the respective blocks are entered in accordance with the above-described conventional method of creating NC machining data, the input values along the respective axes are provided with a positive or negative (+ or −) sign depending upon the coordinate values of the tool destination in each block, thus to indicate the positional relation of the destination. However, the design drawing on which the programming is based usually gives only the dimensional values of the profile, so that the programmer must himself calculate whether an input value is positive or negative when entering the incremental quantities. This makes programming a troublesome operation and is a cause of programming errors.

SUMMARY OF THE INVENTION

Accordingly, an object of the present invention is to provide an input data sign determining method through which dimensional values written on a design drawing can be entered as is without one being concerned with coordinate systems and direction when entering incremental quantities.

Another object of the present invention is to provide a method of determining the sign of input data in an NC machining data creation method, through which an entered dimensional value can be converted into a signed incremental quantity.

A further object of the present invention is to provide an input data sign determining method through which a direction in each block of a part profile is entered using a profile symbol key and the sign of an entered incremental quantity is determined based on the direction.

In a method of creating NC machining data by entering a direction for each block of a part profile through use of a profile symbol key thereby to specify the part profile, followed by entering a dimension for each block of the part profile and using these data to create the NC machining data, the present invention provides an input data sign determining method in which, when a part profile dimension in a predetermined block is specified by incremental quantities along respective axes, the sign of an entered dimensional value is determined on the basis of the direction of the part profile in the block to convert the dimensional value into a signed incremental quantity. According to the present invention, dimensional values can be entered just as they appear on a design drawing without one being concerned with the position of a tool destination when entering incremental quantities. As a result, programming is facilitated and program errors do not occur.

DETAILED DESCRIPTION OF THE PREFERRED EMBODIMENT

The present invention is directed to determining the sign of an incremental quantity by using part profile direction data in a block for which the incremental quantity is to be entered. The direction of a part profile in each block is stored in memory beforehand by using profile symbol keys. Specifically, (a) if a dimensional input value of a block for which the profile symbol key → has been pressed is z, then incremental quantities $X_i$, $Z_i$ along the X and Z axes are recognized as being 0 and $|z|$, respectively (wherein $|z|$ indicates the absolute value of z); (b) if a dimensional input value of a block for which the profile symbol key ← has been pressed is z, then incremental quantities $X_i$, $Z_i$ along the X and Z axes are recognized as being 0 and $-|z|$, respectively; (c) if a dimensional input value of a block for which the profile symbol key ↑ has been pressed is x, then incremental quantities $X_i$, $Z_i$ along the X and Z axes are recognized as being $|x|$ and 0, respectively; (d) if a dimensional input value of a block for which the profile symbol key ↓ has been pressed is x, then incremental quantities $X_i$, $Z_i$ along the X and Z axes are recognized as being $|x|$ and 0, respectively; (e) if dimensional input values of a block for which the profile symbol key ╱ has been pressed are x, z, then incremental quantities $X_i$, $Z_i$ along the X and Z axes are recognized as being $|x|$ and $|z|$, respectively; (f) if dimensional input values of a block for which the profile symbol key ╲ has been pressed are x, z, then incremental quantities $X_i$, $Z_i$ along the X and Z axes are recognized as being $-|x|$ and $|z|$, respectively; (g) if dimensional input values of a block for which the profile symbol key ╲ has been pressed are x, z, then incremental quantities $X_i$, $Z_i$ along the X and Z axes are recognized as being $|x|$ and $-|z|$, respectively; and (h) if dimensional input values of a block for which the profile symbol key ╱ has been pressed are x, z, then incremental quantities $X_i$, $Z_i$ along the X and Z axes are recognized as being $-|x|$ and $-|z|$, respectively.

Figure 1:
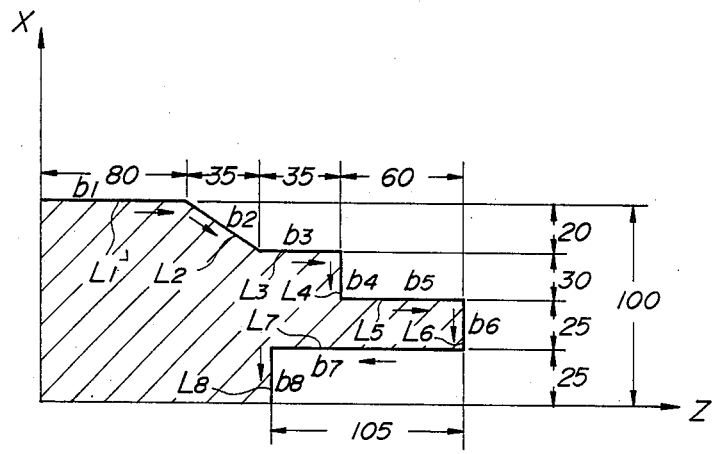
FIG. 1 is a view for describing the entry of a part profile and the dimensional values thereof in the creation of NC machining data.
Figure 3:
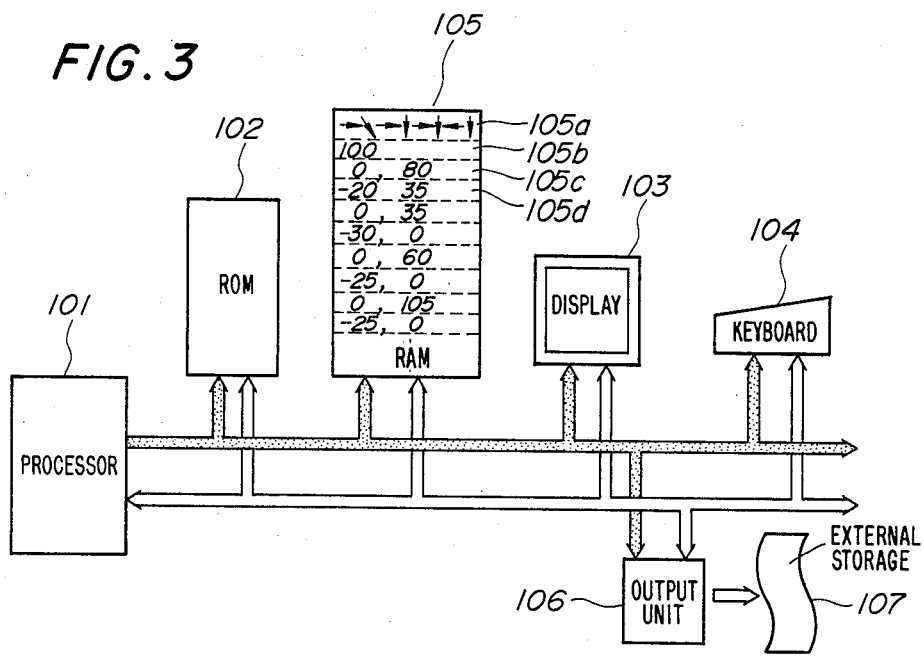
FIG. 3 is a block diagram of an embodiment of the present invention.
Figure 5A:
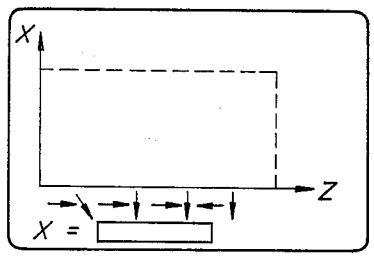
FIGS 5(A)–5(B) illustrate displays prompting entry of dimensions according to the present invention.
Figure 5B:
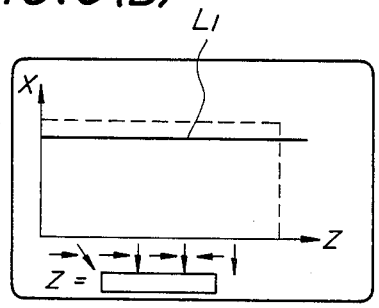
Figure 4:
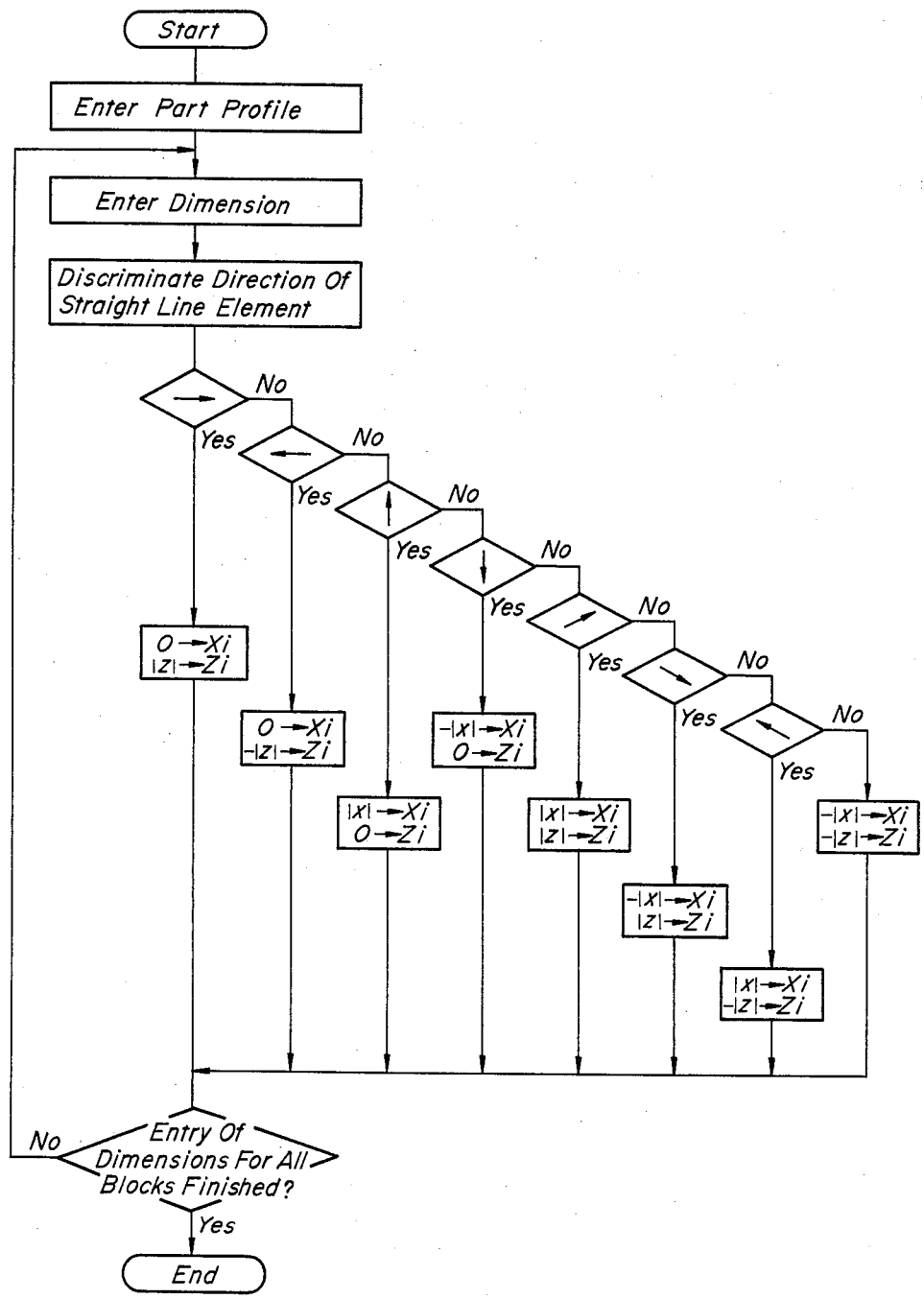
FIG. 4 is a flowchart of processing according to the present invention.

FIG. 3 is a block diagram of an embodiment of the present invention, FIG. 4 is a flowchart of processing, and FIGS. 5A(A)–(D) illustrates displays on a display unit prompting entry of dimensions of the part profile shown in FIG. 1.

(1) When the operation for entering the format of the design drawing, the profile of the blank and the dimensions is completed, a processor 101, which is under the control of a control program stored in a ROM 102, causes inquiries regarding a part profile to be displayed on the display screen of a display unit 103.

(2) While observing the design drawing (e.g., FIG. 1), the operator responds to the inquiries by pressing the prescribed profile symbol keys (see FIG. 2) on a keyboard 104 one block at a time in the clockwise direction in accordance with the profile. When the operator presses an input key NL (FIG. 2) after entering the profile of the eighth block, the part profile is stored in a storage area 105a of a RAM 105.

(3) When entry of a part profile is completed, the processor 101 causes the display screen to display the previously entered coordinate axes and blank profile (FIGS. 5(A)–(D), dashed line) which appear on the design drawing, the part profile in the form of the profile symbols (→, ╲, →, ↓, →, ↓, ←, ↓), and the inquiry reading "X=", as illustrated in FIG. 5(A).

Figure 2:
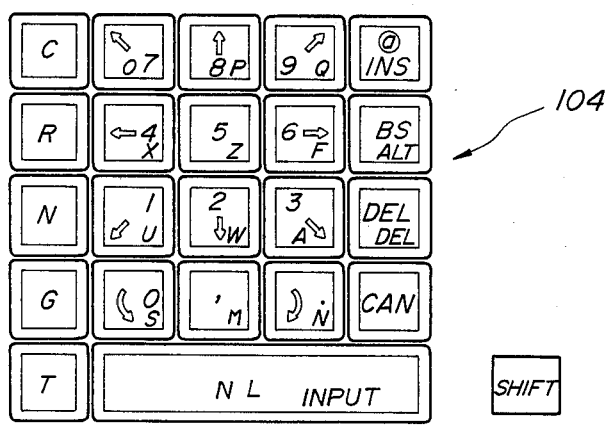
FIG. 2 is a view for describing profile symbol keys on a keyboard.

(4) In response to the inquiry, the operator enters the diameter "100" at the starting point of the straight line element $L_1$ in the first block $b_1$, and subsequently presses the input key NL (see FIG. 2). When this is done, X=100 is stored in a storage area 105b of the RAM 105, the line $L_1$ is displayed on the display screen and so is an inquiry "Z=" regarding an incremental quantity for the straight line element $L_1$ in the first block [see FIG. 5(B)].

(5) In response to the inquiry regarding the incremental quantity for the straight line element $L_1$, a dimensional value "80" is entered just as specified on the drawing. This is followed by pressing the input key NL.

(6) In response to the entry of the dimensional value, the processor 101 discriminates the direction of the part profile in the present block $b_1$ by using the part profile data stored in the RAM 105. On the basis of the part profile direction obtained by the discrimination process, the dimensional value is signed and then converted into an incremental quantity as described above. Since the direction of the part profile in the first block $b_1$ is →, the processor 101 converts 80, which is the absolute value of the entered dimensional value, into an incremental quantity $Z_i$ along the Z axis, converts the incremental quantity $X_i$ along the X axis into 0, and stores these in a storage area 105c of the RAM 105. The incremental quantity along the X axis is 0 and therefore need not be entered.

Figure 5C:
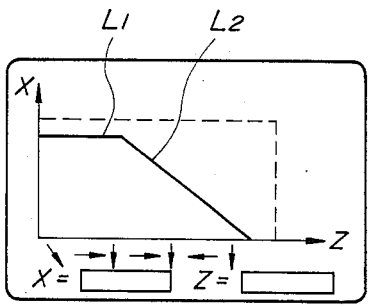
Figure 5D:
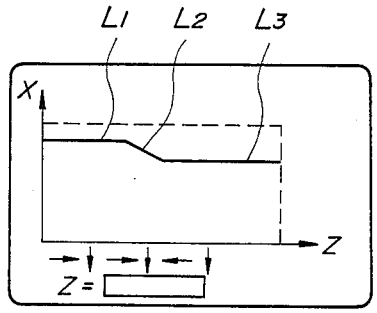

(7) The processor 101 causes the display screen to display the straight line $L_2$ extending downardly toward the right from the end point of the line segment $L_1$, erase the profile symbol → of the first block, and display an inquiry "X=, Z=" regarding incremental quantities for the second block $b_2$ [see FIG. 5(C)].

(8) In respons to the inquiry calling for the incremental quantities of the straight line element $L_2$, the dimensional values X=20, Z=35 are entered as prescribed on the drawing.

(9) In response to the entry of the dimensional values, the processor 101 discriminates the direction of the part profile in the second block $b_2$. Since the direction of the part profile in the second block is ↘ (downwardly toward the right), the processor 101 attaches a minus sign to the absolute value of the entered X-axis dimensional value "20" to convert the value to −20, obtains the absolute value (=35) of the entered Z-axis dimensional value "35", and stores −20, 35 in a storage area 105d of the RAM 105 as X- and Z-axis incremental quantities $X_i$, $Z_i$. The display screen displays the line segments $L_1$, $L_2$, displays the straight line $L_3$ extending horizontally from the end point of the line segment $L_2$, erases the profile symbol ↘ of the second block, and displays the inquiry "Z=" regarding the incremental quantity for the third block [see FIG. 5(D)].

Thereafter, if the dimensions for the third through eighth blocks are entered in similar fashion, the dimensional values 0, 35; −30, 0; 0, 60; −25, 0; 0, −105; −25, 0 will be stored in respective storage areas of the RAM 105 to end the processing for entry of the part profile dimensions.

In FIG. 3, numeral 106 denotes an output unit for the created NC data, and numeral 107 designates an external storage medium for storing NC data.

The foregoing description relates to a case where a part profile is entered in its entirety using the profile symbol keys, followed by entering dimensions one block at a time. However, the present invention is not limited to such case, for an arrangement is permissible wherein dimensions are entered each time one block of a part profile is entered.

According to the present invention as described above, dimensional values of a part profile can be converted into signed incremental quantities (or in other words, the signs of the incremental quantities can be determined) even if the dimensional values are entered just as written on a drawing. This enables programming to be carried out with ease and makes it possible to eliminate dimension input errors. Accordingly, the present invention is well-suited for application to an NC tape automatic creation apparatus in which a part profile is specified by incremental quantities.

We claim:

1. In a method of creating NC machining data by entering a direction for each block of a part profile through use of a profile symbol key selected from the set of ↑, ↗, →, ↘, ↓, ↙, ←, ↖., thereby to specify said part profile, followed by entering a dimension for each block of said part profile and using these entered data to create the NC machining data, an input data sign determining method having steps of:

(a) entering, in the form of an incremental quantity along each axis, a part profile dimension in a predetermined block;

(b) determining the sign of an entered incremental quantity on the basis of the direction of the part profile in said block by:

determining the sign of an entered horizontal-axis incremental quantity as being plus if the part profile is directed rightward along a horizontal axis, determining the sign of an entered-horizontal-axis incremental quantity as being minus if the part profile is directed leftward along a horizontal axis, determining the sign of an entered vertical axis incremental quantity as being plus if the part profile is directed upwardly along a vertical axis, and determining the sign of an entered vertical axis incremental quantity as being minus if the part profile is directed downwardly along the vertical axis;

determining the signs of entered vertical- and horizontal-axis incremental quantities as being plus if the part profile is directed upwardly toward the right, determining the signs of entered vertical- and horizontal-axis incremental quantities as being minus and plus respectively, if the part profile is downwardly toward the right, determining the signs of entered vertical- and horizontal-axis incremental quantities as being plus and minus, respectively, if the part profile is directly upwardly toward the left, determining the signs of entered vertical- and horizontal-axis incremental quantities as being plus if the part profile is directed downwardly toward the left; and (c) converting the incremental quantity into a signed quantity.

* * * * *

UNITED STATES PATENT AND TRADEMARK OFFICE
CERTIFICATE OF CORRECTION

PATENT NO. : 4,722,045

DATED : January 26, 1988

INVENTOR(S) : Kishi et al.

It is certified that error appears in the above-identified patent and that said Letters Patent is hereby corrected as shown below:

Front Page [57] ABSTRACT, line 3, at the beginning of the line, ",→,↗,↓,↙,←,↖)" should be --↑,→,↘,↓,↙,←,↖)--.

Col. 1, line 68, "↓,↓," should be --↘,↙--.

Col. 3, line 42, "5(B)" should be --5(D)--;

line 68, "|x|" should be -- -|x|--.

Col. 4, line 19, "5A(A)" should be --5(A)--;

line 19, change "illustrates" to --illustrate--.

Col. 5, line 9, change "respons" to --response--.

Col. 6, line 48, change "plus" to --minus--.

Signed and Sealed this

Twelfth Day of July, 1988

*Attest:*

DONALD J. QUIGG

*Attesting Officer*   *Commissioner of Patents and Trademarks*